United States Patent

Beereboom

[15] 3,679,754

[45] July 25, 1972

[54] δ-IONONE DERIVATIVES AND PROCESS THEREFOR

[72] Inventor: John J. Beereboom, Old Lyme, Conn.

[73] Assignee: Pfijer Inc., New York, N.Y.

[22] Filed: Jan. 23, 1968

[21] Appl. No.: 699,803

[52] U.S. Cl..............................260/587, 252/522, 260/590
[51] Int. Cl..........................................................C07c 49/48
[58] Field of Search................................260/586, 587, 590

[56] References Cited

FOREIGN PATENTS OR APPLICATIONS 870,699    6/1961    Great Britain..........................260/587

*Primary Examiner*—Leon Zitver
*Assistant Examiner*—Norman Morgenstern
*Attorney*—Connolly and Hutz

[57] ABSTRACT

The conversion of α and β-ionone, and mixtures thereof, to various alkyl-substituted δ-ionone derivatives is accomplished in high yield by the use of a base-catalyzed alkylation reaction step. The resulting isoalkyl-δ-ionones are useful as perfume and flavor odorants, with isoethyl-δ-ionone resembling α-irone.

6 Claims, No Drawings

δ-IONONE DERIVATIVES AND PROCESS THEREFOR

BACKGROUND OF THE INVENTION

This invention relates to a new and useful process for preparing various isoalkyl-δ-ionones, which are of value as perfume odorants. More particularly, it is concerned with the conversion of α- and β-ionone, and mixtures of these same said ionones with one another, to various alkyl-substituted δ-ionone derivatives by means of a base-catalyzed alkylation step conducted in an aprotic solvent system.

In the past, some attempts have been made to prepare these compounds, but without notable success. For instance, in Hoffman-LaRoche British Patent No. 870,699, published June 14, 1961, there is disclosed a method for converting isoalkyl-β-ionones to the corresponding δ-ionone derivatives using a two-step approach, viz., (1) condensing said β-ionone derivative with an ortho ester, such as ethyl orthoformate, or with isopropenyl acetate to form the corresponding isoalkyl-δ-ionone enol-ethers or enol-esters, respectively, followed by (2) hydrolysis of either of the two aforementioned intermediates to the desired final products. Unfortunately, this route does not really lead to the isoalkyl compounds in question, as evidenced by a careful study of their ultraviolet absorption spectra.

SUMMARY OF THE INVENTION

In accordance with the present invention, it has now been found possible to convert α-ionone, β-ionone and mixtures of α- and β-ionone to various alkyl-substituted δ-ionone derivatives in high yield by the use of a novel process which entails alkylating said ionone starting materials in the presence of a basic condensing agent so as to form the corresponding δ-ionone derivative thereof. More specifically, the process of this invention involves preparing a δ-ionone derivative of the formula:

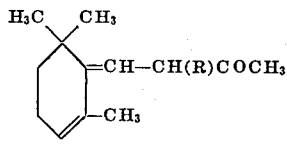

wherein R is a member selected from the group consisting of alkyl having from one to six carbon atoms, allyl, methallyl and phenylalkyl having up to three carbon atoms in the alkyl moiety, by reacting an ionone material selected from the group consisting of α-ionone, β-ionone and mixtures of the two with one another, with at least a substantially equimolar amount of an alkylating agent of the formula RX, where R is as defined for the δ-ionone product and X is an anion selected from the group consisting of chlorine, bromine, iodine, methylsulfate, methanesulfonate, ethanesulfonate, benzenesulfonate and p-toluenesulfonate. The reaction is conducted in an aprotic solvent, preferably selected from the class of inert polar organic solvents, and in the presence of an organometallic basic condensing agent, such as an alkali metal hydride, alkanolate or amide, or an alkali metal-alkyl or aryl compound at a temperature that is generally in the range of from about −20° C. up to about 65° C. for a period of about 0.25 to about 20 hours, with the shorter reaction times being more generally realized at the more elevated temperatures of the aforesaid range and vice versa. In this way, a useful perfume odorant compound, such as isoethyl-δ-ionone, is prepared for the first time in pure form and in substantially high yield.

DETAILED DESCRIPTION OF THE INVENTION

In accordance with a more detailed consideration of the process of this invention for preparing various δ-ionone alkyl derivatives, the preferred solvent to be employed is usually a lower dialkyl sulfoxide or sulfone like dimethylsulfoxide or di-n-propylsulfone, although other aprotic solvents such as dimethylformamide and related N-alkylated lower alkanoamides like N-monoethylacetamide are equally facile for this operation. Additionally, ethers of both the open chain and cyclic variety, such as dioxane, tetrahydrofuran, dimethoxyethane and diethyl ether, are also desirable solvents of choice. Preferred basic condensing agents for use in this reaction include such organometallic reagents as potassium tertiary-butoxide, sodium hydride, sodium methoxide, potassium ethylate, calcium hydride, n-butyl lithium, and sodium amide in liquid ammonia, etc. The alkylating agents (RX) to be employed are as previously defined for RX and include such select reagents as methyl chloride, ethyl iodide, allyl chloride, n-hexyl bromide, benzyl chloride, γ-phenylpropyl iodide, methallyl bromide, dimethyl sulfate, ethyl methanesulfonate, n-butyl p-toluenesulfonate, and the like. In general, it is only necessary that an equimolar amount of reactant and reagent be employed, but an excess of alkylating agent (preferably not to exceed a 0.75 molar excess) may be employed to some advantage in certain instances, especially where the reagent itself is one of high volatility such as methyl chloride. In the latter instances, of course, it is also possible and sometimes even more desirable to employ a closed system whereby the slightly elevated pressures generated therein are more than suitable to keep the volatile halide reagents in solution. Needless to say, the basic condensing agent employed in conjunction with the reactant and reagent need only be present in a sufficient amount to effect removal of the acidic byproduct and/or ensure the desired isomerization effect. Accordingly, an amount slightly in excess of the molar amount of ionone starting material is preferable.

Recovery of the desired products of this invention from the above spent reaction mixture may next be accomplished in a variety of ways, such as, for example, by first pouring said mixture into water and acidifying, followed by the extraction of the resulting aqueous layer with a water-immiscible organic solvent like diethyl ether or n-hexane, etc. In this way, the crude δ-ionone derivative is removed from the acidified aqueous layer. In order to achieve maximum extraction of the ionone derivative from the aforesaid aqueous system, the extraction step is ordinarily carried out by using multiple portions of the solvent in question. The combined solvent extracts can then be washed with water, dried in the usual manner, and the solvent subsequently removed therefrom by conventional means, like evaporation under reduced pressure, for instance, so as to afford the crude product in the form of a residual material. Vacuum distillation of the latter then affords the desired alkyl δ-ionone derivative in substantially pure form.

The β-ionone starting material required for this reaction is a commercially available material that is normally prepared by condensing citral with acetone, in the presence of concentrated sulfuric acid, according to the method of Hibbert et al., as reported in the *Journal of the American Chemical Society*, Vol. 46, p. 119 (1924). The correct chemical name for this compound is actually 4-(2,6,6-trimethyl-1-cyclohexen-1-yl)-3-buten-2-one. α-Ionone [i.e., 4-(2,6,6-trimethyl-2-cyclohexen-1-yl)-3-buten-2-one], on the other hand, is chiefly obtained when phosphoric or formic acid is substituted for concentrated sulfuric acid in the aforesaid condensation reaction between acetone and citral. The latter material, of course, is a well known constituent of lemon grass oil and is widely used in the chemical industry as an intermediate in the synthesis of vitamin A.

As previously indicated, the alkyl-substituted δ-ionones produced by the process of this invention are valuable as odorants and hence, are used in the preparation and compounding of various perfume and flavor compositions. For instance, isoethyl-δ-ionone, i.e., 4-(2,6,6-trimethyl-2-cyclohexen-1-yl)-3-ethyl-2-buten-2-one, a typical and preferred odorant of the present invention, has been found to resemble α-irone, an expensive perfume ingredient ultimately obtained from the orris root, although it is not quite as intense. Further, isomethyl-δ-ionone is somewhat like α-ionone in its effect on the olfactory senses (i.e., a fragrance remiscent of a violet-odor), whereas isoallyl-δ-ionone is more like the aforementioned isoethyl compound. In any event, these new odorants are now provided for the first time in pure form and in substantially high yield by the novel process of the present invention, thereby affording new perfume ingredients in this area at a greatly reduced cost.

This invention is still further illustrated by the following examples, which are not to be construed in any way or manner as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

EXAMPLE I

To a stirred solution of 44.8 g. (0.4 mole) of potassium tert.-butoxide in 200 ml. of dry dimethylsulfoxide, there were added 67.3 g. (0.35 mole) of β-ionone in a dropwise manner during the course of a 30-minute period at 25° C. After stirring for an additional 30 minutes, 30.3 g. (0.60 mole) of methyl chloride gas was bubbled into the mixture during the course of a 45-minute period. The resulting reaction mixture was then stirred at 25° C. for 16 hours and thereafter poured into 1-liter of cold water. After acidification with glacial acetic acid, the resulting aqueous solution was extracted with several-100 ml. portions of diethyl ether and the product subsequently isolated therefrom by means of evaporation under reduced pressure. Vacuum distillation of the residual liquid then afforded 57.6 g. of isomethyl-δ-ionone, b.p. 80°–86°C./0.3 mm. Hg.

The semicarbazone derivative, prepared in the usual manner by conventional organic procedure from the above ionone, was recrystallized several times from methanol-benzene to give 49 g. of pure isomethyl-δ-ionone semicarbazone, m.p. 175°–177°C.

Anal.

Calcd. for $C_{15}H_{25}N_3O$: C, 68.4; H, 9.6; N, 16.0.

Found: C, 68.4; H, 9.4; N, 15.8.

The pure ketone was subsequently regenerated from the semicarbazone by mixing the latter with an equal part by weight of phthalic anhydride and thereafter steam distilling. Upon extraction with diethyl ether, the product was recovered and subsequently isolated by means of vacuum distillation to give 36.2 g. (49 percent) of pure isomethyl-δ-ionone, b.p. 93°–95C./1.3 mm. Hg; $\lambda^{MeOH}$ at 241 mμ (E=18,550) and 290 mμ (sh) (E=1,100).

Anal.

Calcd. for $C_{14}H_{22}O$: C, 81.5; H, 10.8.

Found: C, 81.6; H, 10.8.

EXAMPLE II

To a stirred solution of 112 g. (1.0 mole) of potassium tert.-butoxide dissolved in 400 ml. of dry dimethylsulfoxide, there were added in a dropwise manner 168.2 g. (0.88 mole) of β-ionone during the course of a 30-minute period. The solution was then stirred for an additional 30 minutes and subsequently treated, in a dropwise manner, with 137 g. (0.88 mole) of ethyl iodide dissolved in 100 ml. of dimethylsulfoxide at 25° C. The reaction mixture was then stirred for one hour at 25° C. and for an additional hour at 60° C., and thereafter poured into 2 liters of cold water. After acidification with glacial acetic acid, the resulting aqueous solution was extracted with three-500 ml. portions of diethyl ether. The combined ethereal extracts were then subsequently washed with successive portions of water and saturated sodium chloride solution, respectively, before drying over anhydrous sodium sulfate. The dried ethereal solution was then filtered and evaporated under reduced pressure to give 194 g. of amber liquid that was subsequently distilled in vacuo to afford 147 g. of crude isoethyl-δ-ionone, b.p. 90°–94°C./1 mm. Hg.

The semicarbazone obtained from 142 g. of the above crude product, was prepared in the usual manner, and subsequently recrystallized from ethanol to give 74.5 g. of pure isoethyl-δ-ionone semicarbazone, m.p. 168°–170° C.

Anal.

Calcd. for $C_{16}H_{27}N_3O$: C, 69.3; H, 9.8; N, 15.2.

Found: C, 69.6; H, 9.8; N, 15.0.

The pure ketone was then regenerated from the semicarbazone by the standard phthalic anhydride-steam distillation procedure and subsequently purified by means of vacuum distillation to give 49 g. of pure isoethyl-δ-ionone, b.p. 100°C./3 mm. Hg; $\mu^{MeOH}$ at 241 mμ (E=18,500) and 289 mμ (sh) (E=1,100).

EXAMPLE III

To a stirred solution of 112 g. (1.0 mole) of potassium tert.-butoxide in 500 ml. of pure dimethylsufoxide, there was added 168.2 g. (0.88 mole) of β-ionone in a dropwise manner during the course of a 30-minute period. After stirring for an additional 30 minutes, 67 g. (0.88 mole) of allyl chloride was added thereto in a dropwise manner at 25° C. The resulting reaction mixture was then stirred for 30 minutes and thereafter poured into 2 liters of ice-water. After acidification, extraction with diether ether and evaporation in the usual manner, there were obtained 226 g. of residual liquid that was subsequently distilled in vacuo to give 163 g. of crude isoallyl-δ-ionone, b.p. 93°–97°C./1 mm. Hg.

The above crude product (102 g.) was then converted into the semicarbazone in the same manner as before and recrystallized from benzene-methanol several times to give 51 g. of pure isoallyl-δ-ionone semicarbazone, m.p. 158°–159° C.

Anal.

Calcd. for $C_{17}H_{29}N_3O$: C, 70.1; H, 10.0; N, 14.4.

Found: C, 70.3; H, 9.9; N, 14.3.

The pure ketone was subsequently regenerated from the semicarbazone (30 g.) in the usual manner and after vacuum distillation, there were obtained 16.9 g. of pure isoallyl-δ-ionone, b.p. 96°–98°C./1 mm. Hg; $\lambda^{MeOH}$ at 242 mμ (E=19,700) and 290 Mμ (sh) (E=1,720).

EXAMPLE IV

The procedure described in Example II is repeated here except that n-hexyl bromide is the reagent employed instead of n-propyl iodide and the corresponding final product thus obtained is iso-n-hexyl-δ-ionone. In like manner, the use of benzyl chloride, ethyl bromide, dimethyl sulfate, β-phenylethyl bromide, γ-phenylpropyl chloride, isoamyl bromide, methyl benzenesulfonate, ethyl methanesulfonate, n-butyl p-toluenesulfonate and methyl ethanesulfonate, as individual reagents in this reaction, respectively affords the corresponding isoalkyl-δ-ionone in each case.

EXAMPLE V

The procedure described in Example II is followed except that n-propyl iodide is employed as the reagent of choice instead of ethyl iodide and iso-n-propyl-δ-ionone is the final product obtained. In like manner, the use of methyl iodide, γ-phenylpropyl iodide and n-hexyl iodide, individually in this reaction, each then affords the corresponding isoalkyl-δ-ionone compound as the final product which is obtained.

EXAMPLE VI

The procedure described in Example III is followed except that methallyl bromide is the reagent employed and isomethallyl-δ-ionone is the final product which is obtained. In like manner, the use of allyl bromide and methallyl iodide, respectively, in place of the allyl chloride use in the aforementioned example, then affords the corresponding isoalkenyl-δ-ionone derivative in each instance.

EXAMPLE VII

The procedure described in Example I is repeated using dimethylformamide in place of dimethylsulfoxide as the solvent of choice for this reaction. In this particular case, the final product obtained is again isomethyl-δ-ionone, with the magnitude of the yield being of the same order as that reported in the first example.

In like manner, the use of other aprotic solvents like dioxane, tetrahydrofuran, dimethylglyoxime, diethyl ether, acetone and N-monoethylacetamide, in place of dimethylsulfoxide, also affords similar results with respect to both yield and purity of product.

EXAMPLE VIII

The procedure described in Example I is again followed only this time sodium hydride is employed in place of potassium tert.-butoxide as the strongly basic agent of choice. In this particular case, the final product obtained is also the same as in Example I, viz., isomethyl-δ-ionone, with the yield of product being of the same order of magnitude.

In like manner, the use of other strong bases like sodium methoxide, potassium ethylate, calcium hydride, n-butyl lithium and sodium amide in liquid ammonia, in place of potassium tert.-butoxide of the first example, also affords similar results in each case.

EXAMPLE IX

To a suspension consisting of 56 g. (0.5 mole) of potassium tert.-butoxide in 250 ml. of dry dimethylsulfoxide, there were added dropwise, with stirring, 84 g. (0.44 mole) of pure α-ionone. After the addition was complete, 62 g. (0.44 mole) of methyl chloride was added to the resulting solution, while maintaining the temperature of the reaction mixture at 25° C. by means of an ice bath. Upon completion of this step, the reaction mixture was stirred for an additional 30 minutes at 25° C. and then poured into 1-liter of ice-cold water, followed by acidification with 75 ml. of glacial acetic acid. The acidified aqueous medium was then extracted with three-100 ml. portions of diethyl ether, and the combined ethereal extracts were subsequently dried over anhydrous sodium sulfate and filtered. The resulting filtrate was then concentrated in vacuo to remove the ether, and the crude residual material (80 g.) so obtained was distilled under reduced pressure to give 33.7 g. of isomethyl-δ-ionone, b.p. 80°–82°C./0.1 mm. Hg. and identical in every respect with the product of Example I. This was attested to by a comparison of their infra red absorption spectra and nuclear magnetic resonance curves.

EXAMPLE X

The procedure described in Example II is followed except that the starting material employed is a mixture of α- and β-ionone. In this particular case, mixture consisting of 60 percent β-ionone and 40 percent α-ionone, and the corresponding product obtained is isoethyl-δ-ionone, identical in every respect with the product of EXample II.

EXAMPLE XI

The procedure described in Example III is followed except that the starting material employed is a mixture of α- and β-ionone. In this particular case, the mixture consisted of 80 percent β-ionone and 20 percent α-ionone, and the corresponding product obtained is isoallyl-δ-ionone, identical in every respect with the product of Example III.

What is claimed is:

1. A process for alkylating ionone to prepare the corresponding δ-ionone derivative thereof, said δ-ionone derivative being of the formula:

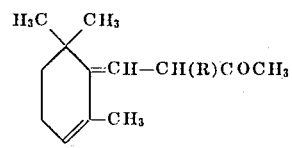

wherein R is a member selected from the group consisting of alkyl having from one to six carbon atoms, allyl, methallyl and phenylalkyl having up to three carbon atoms in the alkyl moiety, which comprises reacting an ionone material selected from the group consisting of α-ionone, β-ionone and mixtures of the two with one another, with at least a substantially equimolar amount of an alkylating agent of the formula RX, where R is as defined for the δ-ionone product and X is an anion selected from the group consisting of chlorine, bromine, iodine, methylsulfate, methansulfonate, ethanesulfonate, benzenesulfonate and p-toluenesulfonate, said reaction being conducted in an aprotic solvent and in the presence of an organometallic basic condensing agent at a temperature that is in the range of from about −20° C. up about 65° C. for a period of about 0.25 to about 20 hours.

2. A process as claimed in claim 1 wherein the aprotic solvent employed is dimethylsulfoxide.

3. A process as claimed in claim 1 wherein the basic condensing agent employed is potassium tertiary-butoxide.

4. A process as claimed in claim 1 wherein the alkylating agent employed is methyl chloride.

5. A process as claimed in claim 1 wherein the alkylating agent employed is ethyl iodide.

6. A process as claimed in claim 1 wherein the alkylating agent employed is allyl chloride.

* * * * *